United States Patent [19]

Schmidt

[11] Patent Number: 5,186,958
[45] Date of Patent: Feb. 16, 1993

[54] INDUSTRIAL EQUIPMENT FOR MANUFACTURING COMPRESSION MOLDINGS

[75] Inventor: Klaus Schmidt, Dortmund, Fed. Rep. of Germany

[73] Assignee: Hoesch Maschinenfabrik Deutschland AG, Dortmund, Fed. Rep. of Germany

[21] Appl. No.: 716,705

[22] Filed: Jun. 18, 1991

[30] Foreign Application Priority Data

Jun. 19, 1990 [DE] Fed. Rep. of Germany ... 900685[U]

[51] Int. Cl.$^5$ .................. B29C 39/04; B29C 39/22; B29C 45/17
[52] U.S. Cl. .................. 425/193; 100/918; 425/195
[58] Field of Search .......... 425/190, 195, 193, 182; 100/918

[56] References Cited

U.S. PATENT DOCUMENTS

| | | | |
|---|---|---|---|
| 4,273,738 | 6/1981 | Spengler | 425/193 |
| 4,648,825 | 3/1987 | Heil et al. | 425/195 |
| 4,702,685 | 10/1987 | Fruntzek | 425/182 |
| 4,737,095 | 4/1988 | Hehl | 425/195 |
| 4,810,182 | 3/1989 | Groll | 425/190 |
| 4,880,792 | 11/1989 | Yoshioka et al. | 100/918 |
| 4,902,214 | 2/1990 | Min | 425/195 |
| 4,952,131 | 8/1990 | Shirai et al. | 425/190 |
| 5,002,711 | 3/1991 | Iwama et al. | 425/193 |
| 5,040,965 | 8/1991 | Baird | 100/918 |
| 5,061,169 | 10/1991 | Yamashiro et al. | 425/190 |
| 5,063,648 | 11/1991 | Yonezawa et al. | 425/190 |
| 5,114,330 | 5/1992 | Nielsen | 425/195 |

Primary Examiner—Willard Hoag
Attorney, Agent, or Firm—Max Fogiel

[57] ABSTRACT

An arrangement for manufacturing compression moldings in which at least two compressing lines and two tool-changing carriages are provided. Each compressing line has a molding press located between loading and unloading mechanisms. The tool-changing carriages travel on a horizontal rail back and forth across the compressing lines. A platform travels up and down on each tool-changing carriage, and a shaft is provided upstream of each molding press on a tool-changing side for positioning and centering the platform.

5 Claims, 4 Drawing Sheets

INDUSTRIAL EQUIPMENT FOR MANUFACTURING COMPRESSION MOLDINGS

BACKGROUND OF THE INVENTION

The invention relates to industrial equipment for manufacturing compression moldings and with at least two adjacent compressing lines and two tool-changing carriages, whereby each compressing line contains a molding press between a loading device and an unloading device and whereby the tool-changing carriages travel back and forth across the compressing lines on a horizontal rail.

Equipment of this type is state of the art.

The tools are replaced by advancing them along and across the compressing lines in a horizontal plane at the same level as the mold supports and the tool accommodations in the traveling tool-changing carriages.

The presses in equipment of this type are relatively far apart to allow the tools in one to be replaced without impeding the operation of one of its neighbors.

SUMMARY OF THE INVENTION

The object of the present invention is to improve equipment of the aforesaid type to the extent that, even though the presses are relatively close together, the tools in one can be replaced without impeding the operation of a neighbor.

This object is attained in accordance with the invention by a shaft upstream of each press on the tool-changing side for positioning and centering a platform that travels up and down on each tool-changing carriage.

Each tool-changing carriage has an elevating mechanism that scissors.

Four positioning rollers and four supporting structures are associated with each shaft in accordance with another characteristic of the invention.

Each platform has four centering bolts.

BRIEF DESCRIPTION OF THE DRAWINGS

The invention will now be specified with reference to the drawing, which is a schematic representation of one embodiment.

DESCRIPTION OF THE PREFERRED EMBODIMENTS

Figure 1:
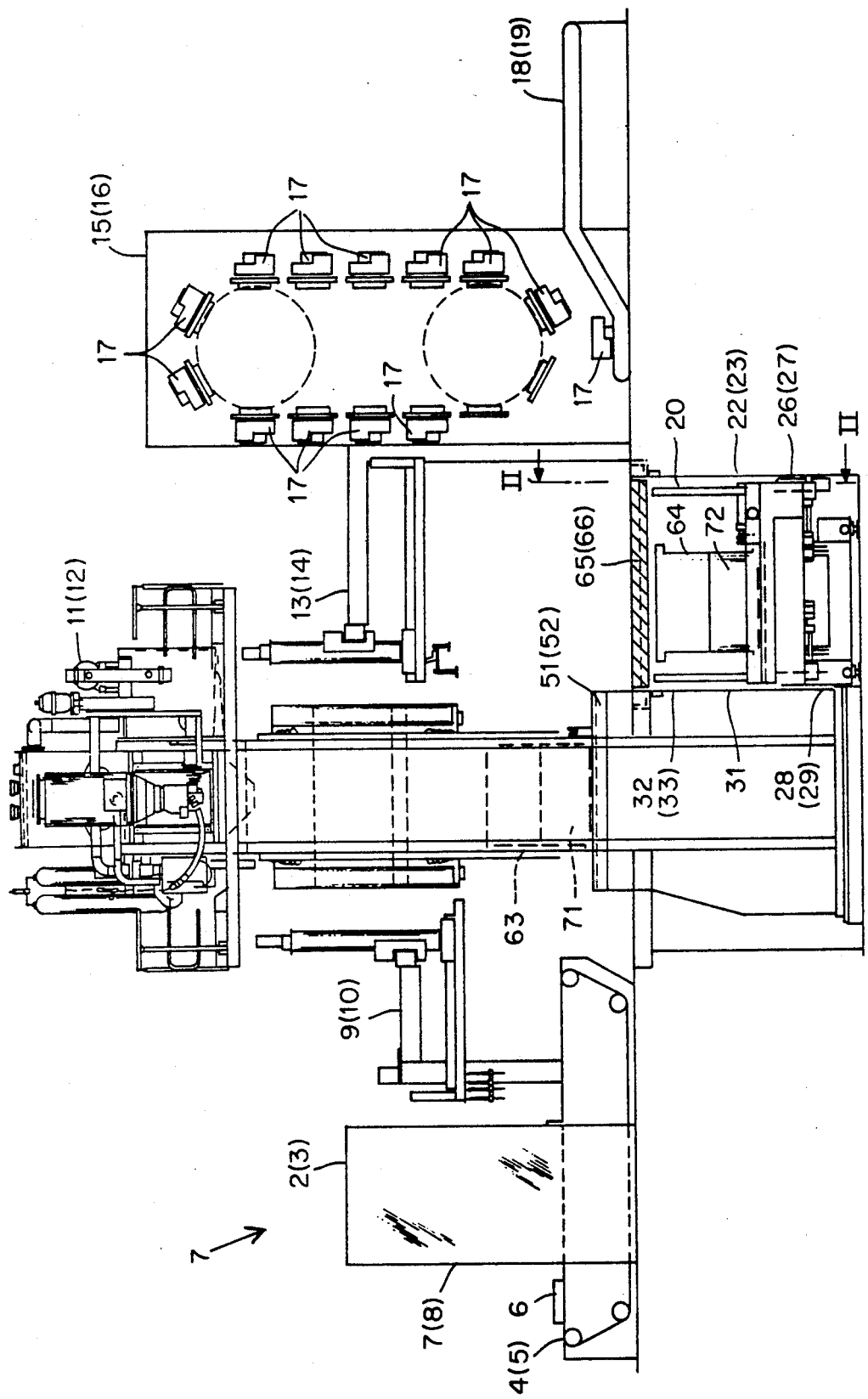
FIG. 1 illustrates industrial equipment with a view of a tool-changing device and a section through a the cover on a shaft.

Industrial compression-molding equipment 1 has two adjacent compressing lines 2 and 3. Each line comprises a conveyor 4 and 5 for advancing the sheet 6, a furnace 7 and 8 for heating it, a loading mechanism 9 and 10, a hydraulic press 11 and 12, an unloading mechanism 13 and 14, a cooler 15 and 16 for the moldings 17, another conveyor 18 and 19 for advancing the cool moldings, and a tool-changing device 20.

Figure 2:
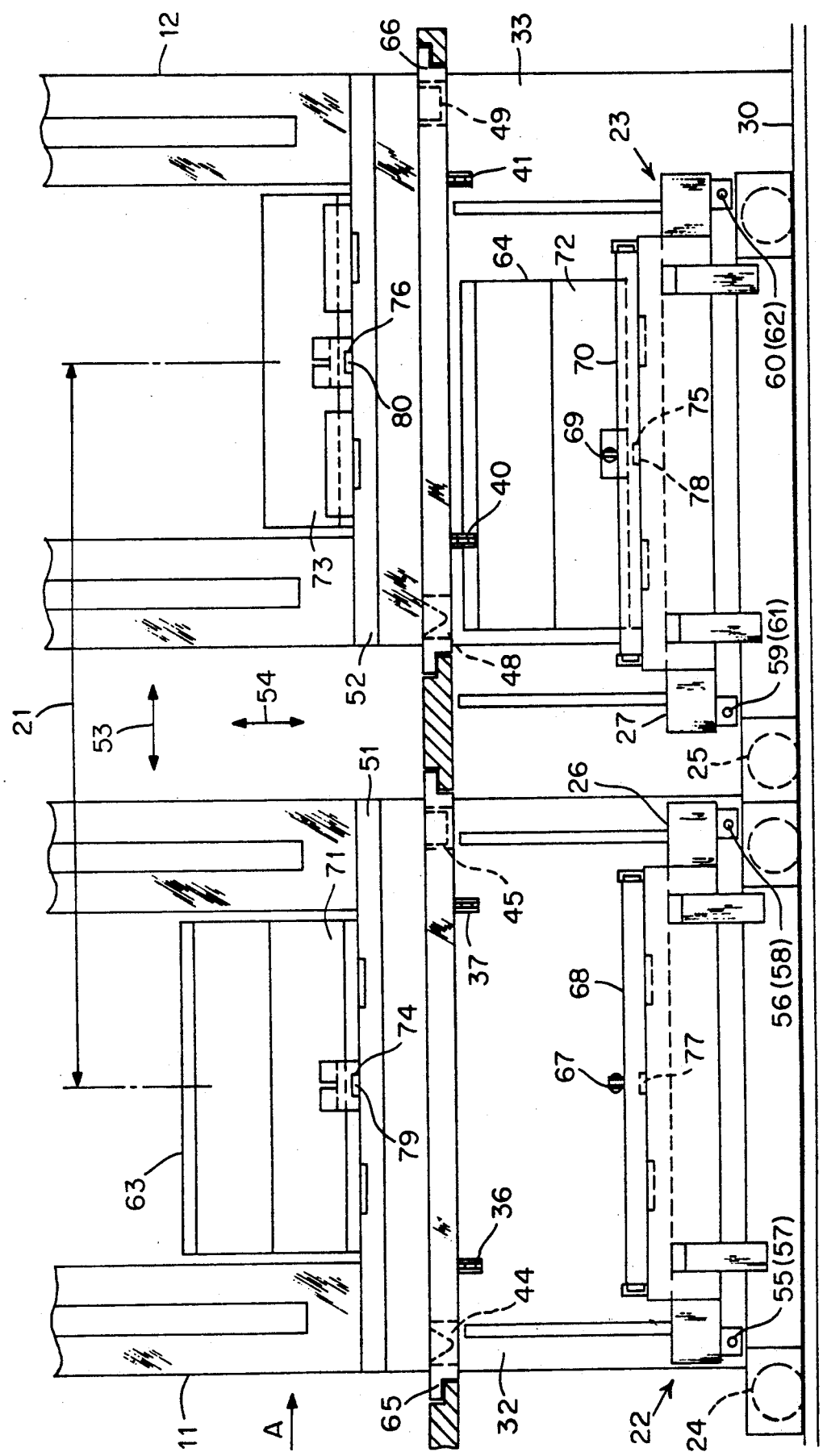
FIG. 2 is a larger-scale partial section along the line II-II in FIG. 1.

The presses are a distance 21 apart (FIG. 2). Sheet 6 is made of thermoplastic.

Tool-changing device 20 comprises two identically designed tool-changing carriages 22 and 23, each with a drive mechanism 24 and 25 and a platform 26 and 27 that travels up and down.

Each tool-changing carriage 22 and 23 has a scissoring mechanism 28 and 29 for raising and lowering a platform 26 and 27.

Tool-changing carriages 22 and 23 travel across compressing lines 2 and 3 on a horizontal rail 30.

Upstream of each hydraulic press 11 and 12 is a shaft 32 and 33 on tool-changing side 31, each with four positioning rollers 34, 35, 36, & 37 and 38, 39, 40, & 41 and four supporting structures 42, 43, 44, & 45 and 46, 47, 48, & 49.

Rollers 34 to 41 position the elevated platforms 26 and 27 at a distance 50 from mold supports 51 and 52.

Supporting structures 42 to 49 center the elevated platforms along the rail (in the direction indicated by double-headed arrow 54) and perpendicularly (in the direction indicated by double-headed arrow 54).

The hydraulic press 11 illustrated in FIGS. 1 and 2 has a tool 63 that rests against mold support 51 and needs to be replaced with another tool 64, on tool-changing carriage 23.

Associated with each shaft 32 and 33 is a cover 65 and 66. Shaft cover 65 is raised and lowered along with each platform 26 and 27 while the tool is changed.

Figure 3:
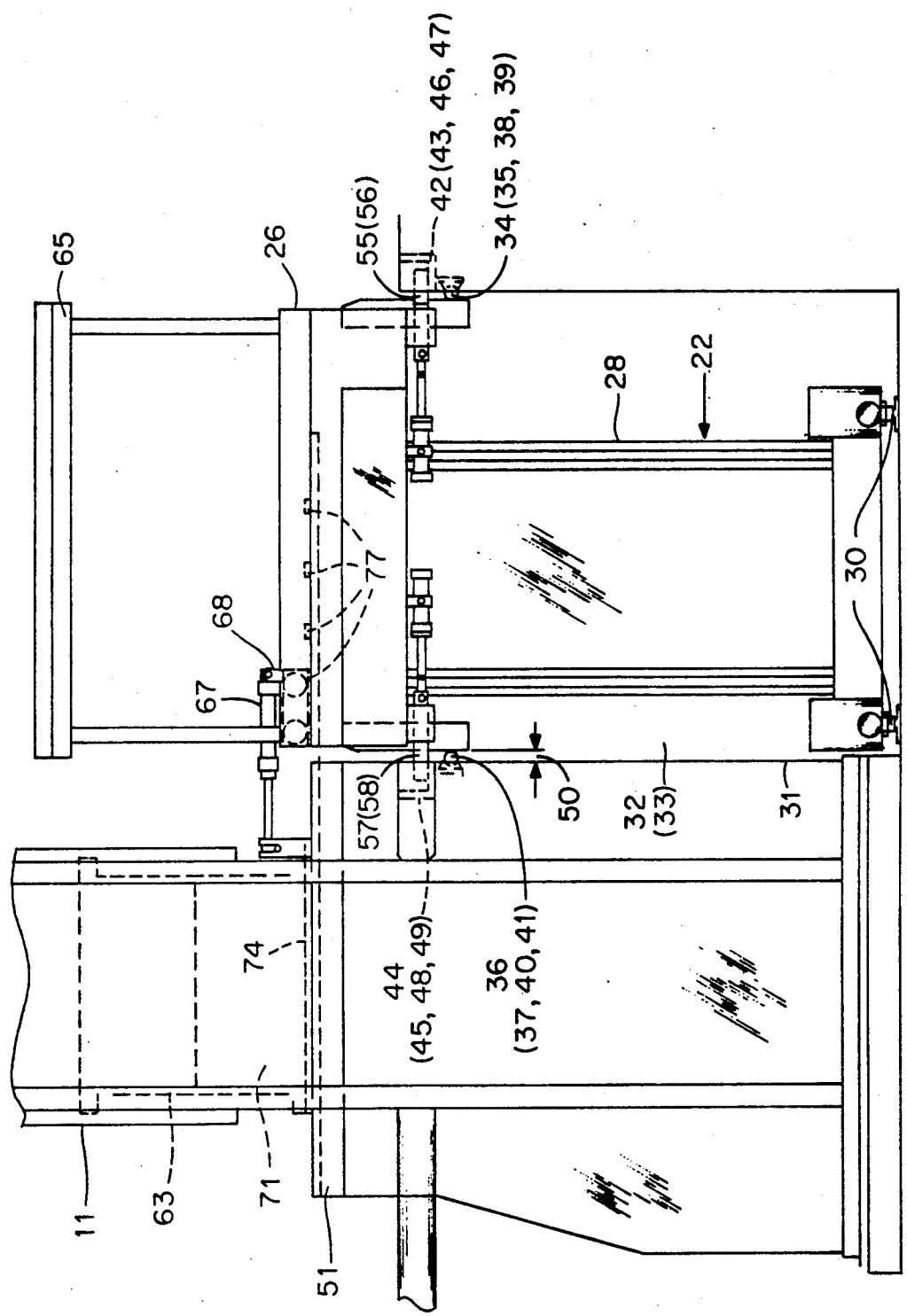
FIG. 3 is a partial view in the direction indicated by arrow A in FIG. 2 before retraction of a tool from a press.

At the beginning of the tool-changing process, the platform 26 on tool-changing carriage 22 is elevated slightly above the level of mold support 51, the four centering bolts 55, 56, 57, and 58 are forced out, platform 26 is centered by lowering it onto supporting structures 42, 43, 44, & 45, and tool 63 is secured to a cylinder 67 that travels back and forth on the platform (FIG. 3).

Figure 4:
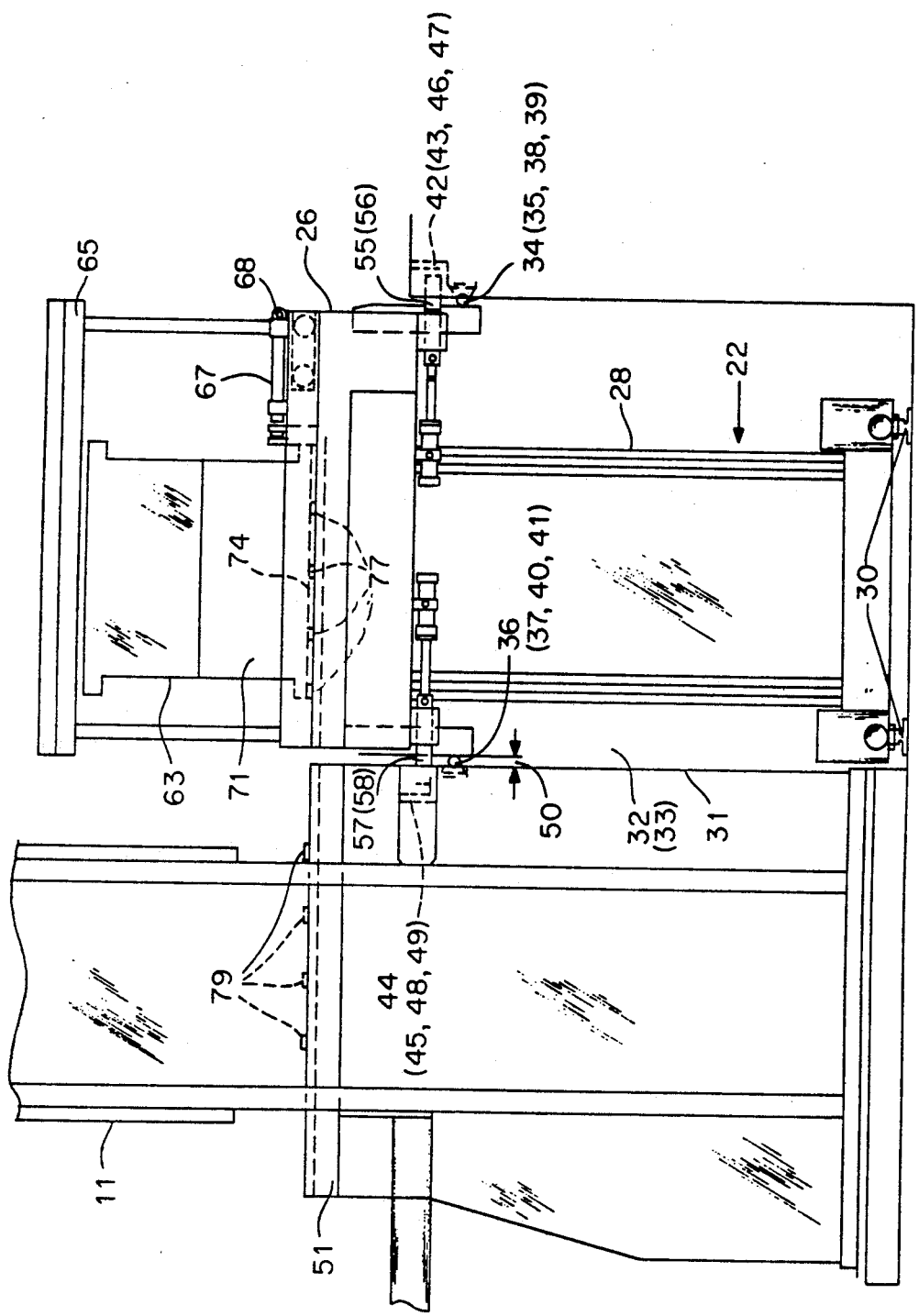
FIG. 4 is a similar view once the tool has been retracted.

Tool 63 is then removed from mold support 51 to platform 26 by traveling cylinder 67 and a displacing mechanism 68 (FIG. 4).

Platform 26 is then elevated slightly along with tool 63, centering bolts 55, 56, 57, and 58 are retracted, the platform is lowered along with the tool, and tool-changing carriage 22 travels out of shaft 32 along with the tool.

Tool 64 is then advanced into shaft 32 along with tool-changing carriage 23 so that it can be positioned for displacement. Such a displacement position on the part of tool 64 is comparable to the position of a tool 63 extracted out of hydraulic press 11 (FIG. 4).

Once tool 64 has arrived in the displacement position, it is forced off platforms 27 and onto mold support 51 by a displacement cylinder 69 in conjunction with a displacement mechanism 70.

Platform 27 and tool 64, which has been forced onto mold support 51, now assume a position comparable to that of the platform 26 and tool 63 in FIG. 3.

The bottom halves 71, 72, and 73 of the tools have positioning grooves 74, 75, and 76 around the middle.

I claim:

1. An arrangement for manufacturing compression moldings, comprising: at least two compressing lines and two tool-changing carriages; loading means and unloading means in each compressing line; a molding press between said loading means and said unloading means; a horizontal rail, and tool-changing carriages traveling on said horizontal rail back and forth across said compressing lines; a platform traveling up and down each tool-changing carriage; a shaft upstream of each said molding press on a tool-changing side for positioning and centering said platforms.

2. An arrangement as defined in claim 1, including scissoring elevating means on each tool-changing carriage.

3. An arrangement as defined in claim 1, including positioning rollers and four supporting structure associated with each said shaft.

4. An arrangement as defined in claim 1, wherein said platforms has four centering bolts.

5. An arrangement for manufacturing compression moldings, comprising: at least two compressing lines and two tool-changing carriages; loading means and unloading means in each compressing line; a molding press between said loading means and said unloading means; a horizontal rail, said tool-changing carriages traveling on said horizontal rail back and forth across said compressing lines; a platform traveling up and down on each tool-changing carriage; a shaft upstream of each said molding press on a toll-changing side for positioning and centering said platform; elevating means on each tool-changing carriage and comprising scissor means; positioning rollers and four supporting structures associated with said shaft; and four centering bolts on each platform.

* * * * *